United States Patent [19]
Wright et al.

[11] Patent Number: 4,942,654
[45] Date of Patent: Jul. 24, 1990

[54] METHOD FOR ASSEMBLY OF SERPENTINE HEAT EXCHANGER

[75] Inventors: William D. Wright, Lyndonville; George K. Snyder, Lockport, both of N.Y.

[73] Assignee: General Motors Corporation, Detroit, Mich.

[21] Appl. No.: 356,104

[22] Filed: May 24, 1989

[51] Int. Cl.$^5$ .......................................... B21D 53/02
[52] U.S. Cl. ..................... 29/890.035; 29/446; 29/505; 29/514; 29/727; 29/890.046; 228/183
[58] Field of Search .................. 29/157.3 R, 157.3 A, 29/157.3 B, 157.4, 446, 450, 453, 514, 505, 726, 727; 228/183

[56] References Cited

U.S. PATENT DOCUMENTS

| | | | |
|---|---|---|---|
| 3,021,804 | 2/1962 | Simpelaar | 29/157.4 |
| 4,044,443 | 8/1977 | Chartet | 29/450 |
| 4,486,933 | 12/1984 | Iwase et al. | 29/726 |
| 4,587,701 | 5/1986 | Koisuka et al. | 29/157.3 A |
| 4,637,132 | 1/1987 | Iwase et al. | 29/726 |
| 4,730,669 | 3/1988 | Beasley et al. | 29/157.4 |
| 4,831,701 | 5/1989 | Yutaka | 29/157.3 R |

FOREIGN PATENT DOCUMENTS 0014185  1/1982  Japan .......................... 29/157.3 B Primary Examiner—Joseph M. Gorski
Assistant Examiner—I. Cuda
Attorney, Agent, or Firm—R. L. Phillips

[57] ABSTRACT

Serpentine heat exchanger tubes are formed with spaces smaller than the fins which must fit in the spaces, the tubes are elastically spread apart so that tubes can be inserted, and the tubes are then allowed to contract to grip the elements for good contact and to help maintain the assembly until a brazing operation. A machine for inserting the fins has spreader blades for insertion into the tube spaces remote from the tube bends, and including sets of blades which then are moved toward the bends to fully dilate the spaces to permit easy insertion of the fins.

5 Claims, 5 Drawing Sheets

METHOD FOR ASSEMBLY OF SERPENTINE HEAT EXCHANGER

FIELD OF THE INVENTION

This invention relates to a method of forming serpentine heat exchangers and an apparatus for inserting fins or air centers between turns of serpentine tubing to form a heat exchanger core.

BACKGROUND OF THE INVENTION

It has been found desirable in heat exchangers, particularly those used for condensers in refrigeration systems, to incorporate a serpentine tube configuration. The tubes are flat and are bent to form a plurality of straight passages connected by U-shaped bends. Preferably, two pre-bent extruded tubes are nested within one another and interconnected by fins (also called air centers) to form a tube and center style condenser. This style condenser uses tubes as a passageway for the refrigerant and the air centers attached outside the tubes increase the heat transfer. By nesting the two serpentine tubes together, a two passage serpentine condenser with increased performance is created.

The assembly of the air centers or fins between the tubes of the two passage condenser without special methods and equipment would be a difficult and time consuming process requiring hand insertion of the fins one at a time. Further, once the fins are assembled into the core, they must not move during subsequent handling or brazing. Steel banding straps are typically used to hold the core together until brazing is completed. In the case of the nested tube configuration, however, the banding pressures are not transmitted throughout the entire core. That is, the portions of the core having nested bends are relatively stiff and resist the externally applied pressure so that fins in such areas would be loosely held, at best. To some degree the same phenomenon occurs in a single serpentine tube configuration since the regions near each bend is stiffer than the rest of the core and the fins near the bend may not be held by the applied banding pressures.

SUMMARY OF THE INVENTION

It is therefore an object of the invention to provide a method and apparatus for assembling serpentine heat exchanger cores by loading all the fins at the same time.

It is another object of the invention to provide a method of assembling heat exchanger cores which yields an assembly held together at least partly by internal forces.

It is another object of the invention to provide an apparatus for as ling fins into a serpentine tube structure.

The invention is carried out by a machine for assembling heat exchanger fin elements into a serpentine tube structure comprising straight tube sections coupled bY bends and fining spaces between adjacent tube sections for receiving the fin elements, the machine comprising: means for holding a serpentine tube structure, at least two sets of movable spreaders for insertion into the spaces between the adjacent tube sections, means for engaging the spreaders with the spaces at locations remote from the tube bends to locally spread apart the tubes, means for moving the spreaders toward the tube bends to further spread the tubes sufficiently for the insertion of fin elements, and means for retracting the spreaders from the spaces, whereby fin elements can enter the spaces as the spreaders are retracted and the tubes spring back to hold the fin elements.

The invention is also carried out by the method of assembling a serpentine style heat exchanger comprising the steps of: forming fins having a desired thickness, forming a serpentine tube structure with inter-tube spacing slightly less than the fin thickness thereby impeding insertion of the fins into the inter-tube spaces, elastically expanding the serpentine structure to enlarge the inter-tube spaces sufficiently to admit the fins, inserting the fins into the enlarged inter-tube spaces, and allowing the tube structure to elastically contract and grip the fins so that the fins are held under pressure of the serpentine tube.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

The method and apparatus described here have been designed for building the cores of serpentine condensers having two nested serpentine tubes. The advantages of the invention are not limited to that style of heat exchanger and applies to other styles as well. For example, a single tube serpentine structure also would require the same method and apparatus. The material most commonly used for such heat exchangers is aluminum, but the invention is also effective with other materials.

Figure 1:
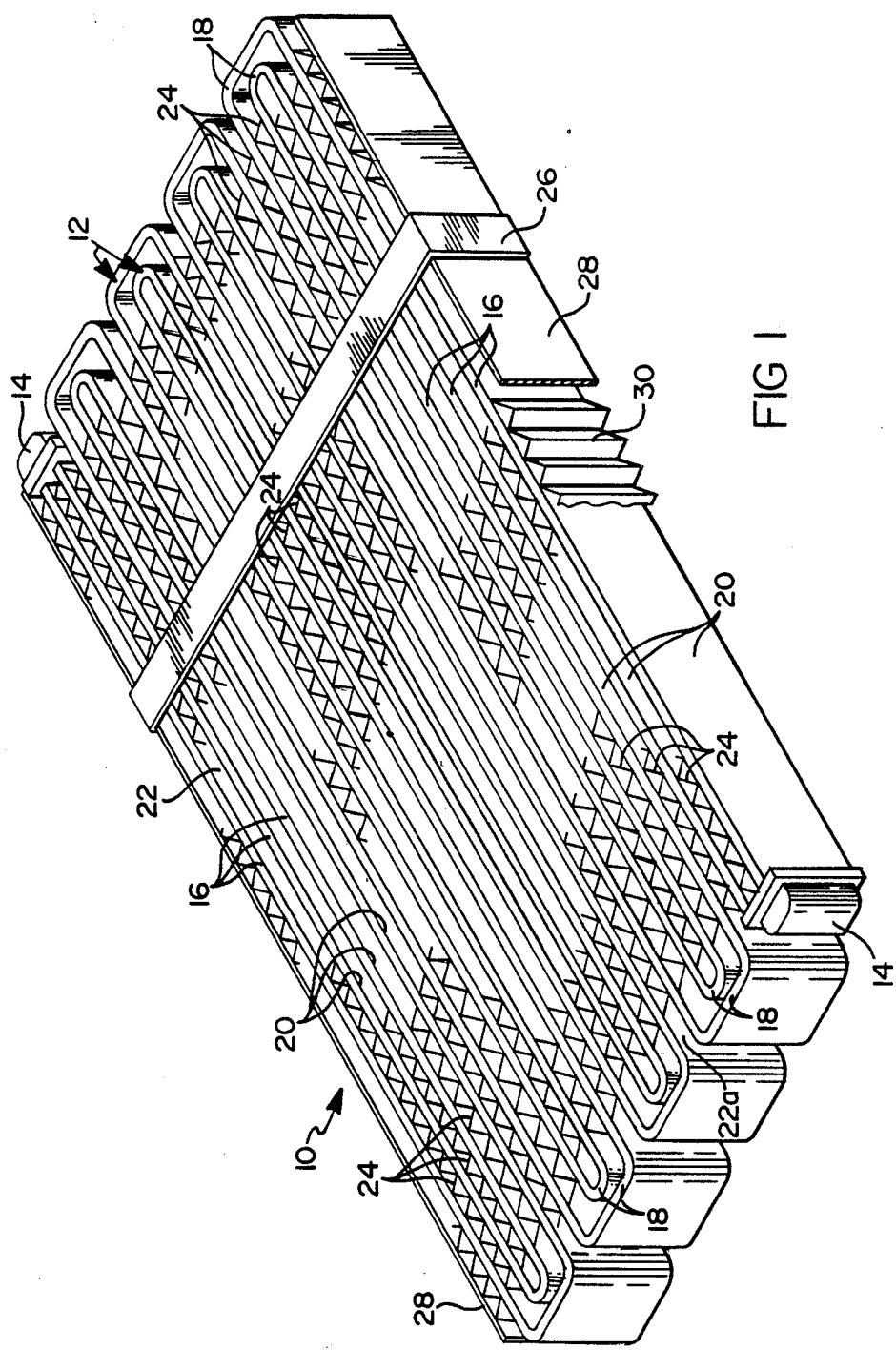
FIG. 1 is a partly broken away isometric view of a heat exchanger core made according the method of the invention.

Referring to FIG. 1, a core 10 to be fabricated comprises two serpentine tubes 12 nested together and having common end fittings 14 which couple the tubes in parallel and provide inlet and outlet terminals. Each tube 12 has n plurality of straight tube sections 16 connected by generally U-shaped bends 18. The bends 18 alternate between large bends and small bends to allow nesting the tubes are of generally flat cross section so that the straight tube sections 16 have planar sides 20 facing one another to define inter-tube spaces 22. Fins or air centers 24 having about the same width as the tubes fit within the spaces in close contact with the sides 20 to promote good brazed joints and high thermal conductivity. The bends 18 of the tubes 12 are precisely formed to yield the desired spacing and fit. Likewise the fins 24 are formed to a specific thickness to achieve the desired fit within the spaces 22.

In the practice of the invention the spaces 22 prior to assembly are slightly smaller than the thickness of the fins 24 so that the sides 20 of the tubes tightly grip the fins 24 after assembly. The fin thickness is on the order of the percent greater than the nominal tube spacing. This if the inter-tube space is 0.6 inch, the fin thickness will be a few thousandths of an inch larger. This assures that prior to brazing, the elements of the assembly are held together and that good contact is made between the tubes and fins to promote good braze joints. An exception to the tight fit occurs at the spaces 22a between adjacent large bends where the force applied by the bends at the opposite end of the core are small. Partly for this reason temporary steel bands 26 are used to help hold the assembly, together. Another reason for the bands 26 is that side plates 28 and fins 30 between the side plates 28 and tubes 12 are also part of the core 10 and have no other means of attachment to the rest of the core.

The oversize fins 24 are assembled into the spaces 22 between the nested tubes 12 by spreading apart the tubes until the spacing is larger than the fin thickness, inserting the fins, and allowing the tubes to contract into tight contact with the fins. The tubes are spread apart by inserting a tool into each spacing, the tool having a thickness a few thousandths of an inch larger than the fin thickness. Then the tool is retracted at the same time the fin is inserted, the fin following the tool during the retraction. The tools synchronously enter and leave the inter-tube spaces 22 and the fins are inserted simultaneously.

Figure 2:
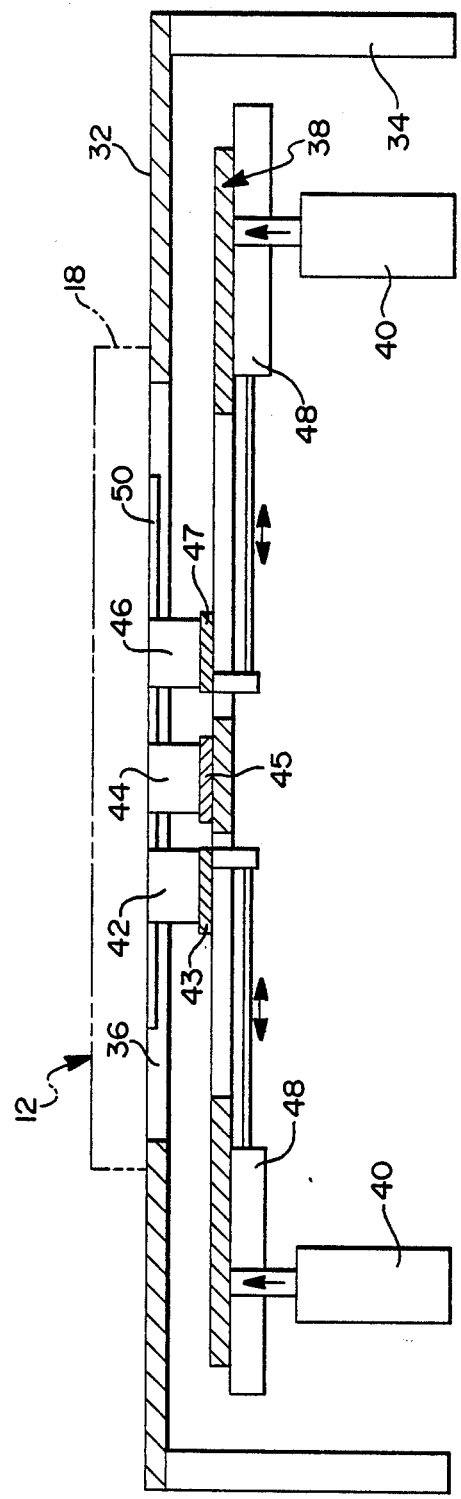
FIG. 2 is a partly broken away elevational view of a machine for assembling fins and tubing according to the invention.

In FIG. 2 the apparatus for assembling the fins 24 to the tubes 12 includes a table 32 on supports 34, the table top having an aperture 36 a little smaller than the nested tubes 12 so that the bends 18 of the tubes can rest on the table margin adjacent the aperture. Beneath the table in elevator 38 carried by hydraulic lifts 40 for vertical movement holds three sets of spreader blades 42, 44 and 46 below the aperture 36. The sets 42, 44 and 46 have blocks 43, 45 and 47 holding blades 42', 44' and 46', respectively, sized for approximate alignment with the spaces 22 of the tubes 12 so that the blades can fit into the tube spaces. The center spreader blade set 44 is positioned about midway between the bends of the tubing 12 and its block 45 is fixedly secured to the elevator 38. The two blocks 43 and 47 of the outboard spreader blade sets 42 and 46 are slidably mounted on the elevator for lateral movement between positions adjacent the center set 44 and positions near the bends 18 of the tubes 12. Hydraulic actuators 48 mounted on the elevator 38 are coupled to the outboard blocks 43 and 47 to control the lateral movement of the spreader sets 42 and 46. The respective blades of the three sets are aligned with one another and each group of three aligned blades carries a bridge element 50 which is a straight bar. The forward nose of the blade 44' has a slot 52 (shown in FIG. 5) which securely holds the bridge element 50 while corresponding slots in the outboard blades 42' and 46' slidably engage the element 50. The apparatus is operated by raising the elevator 38 to extend the blades through the aperture 36, manually or automatically placing the serpentine tubes 12 over the blades to spread the tubes (so that the tube bends 18 rest on the table), moving the outboard blade sets 42, 46 laterally toward the bends 18 to fully dilate the spaces 22, loading the fins into the spaces above the blades, and lowering the elevator 38 to remove the blades and permitting the find to fall into place. Some light pressure may be applied to the fins to insure their insertion into the spaces. The bridge elements 50 and the blades support the fins as the blades retract.

Figure 3:
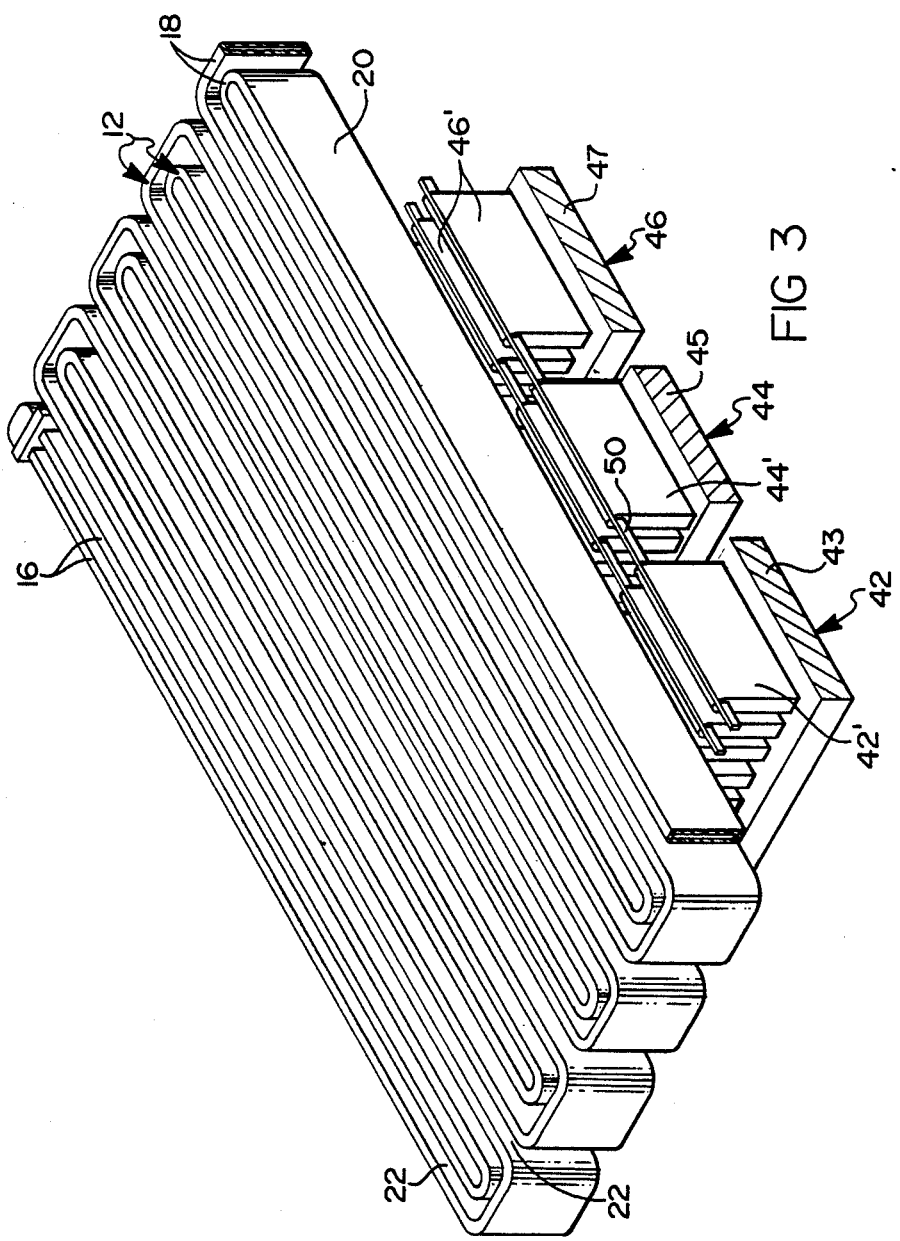
FIG. 3 is an isometric view of serpentine heat exchanger tubing and spreader tooling for use in assembling fins into the tubing according to the invention.
Figure 4:
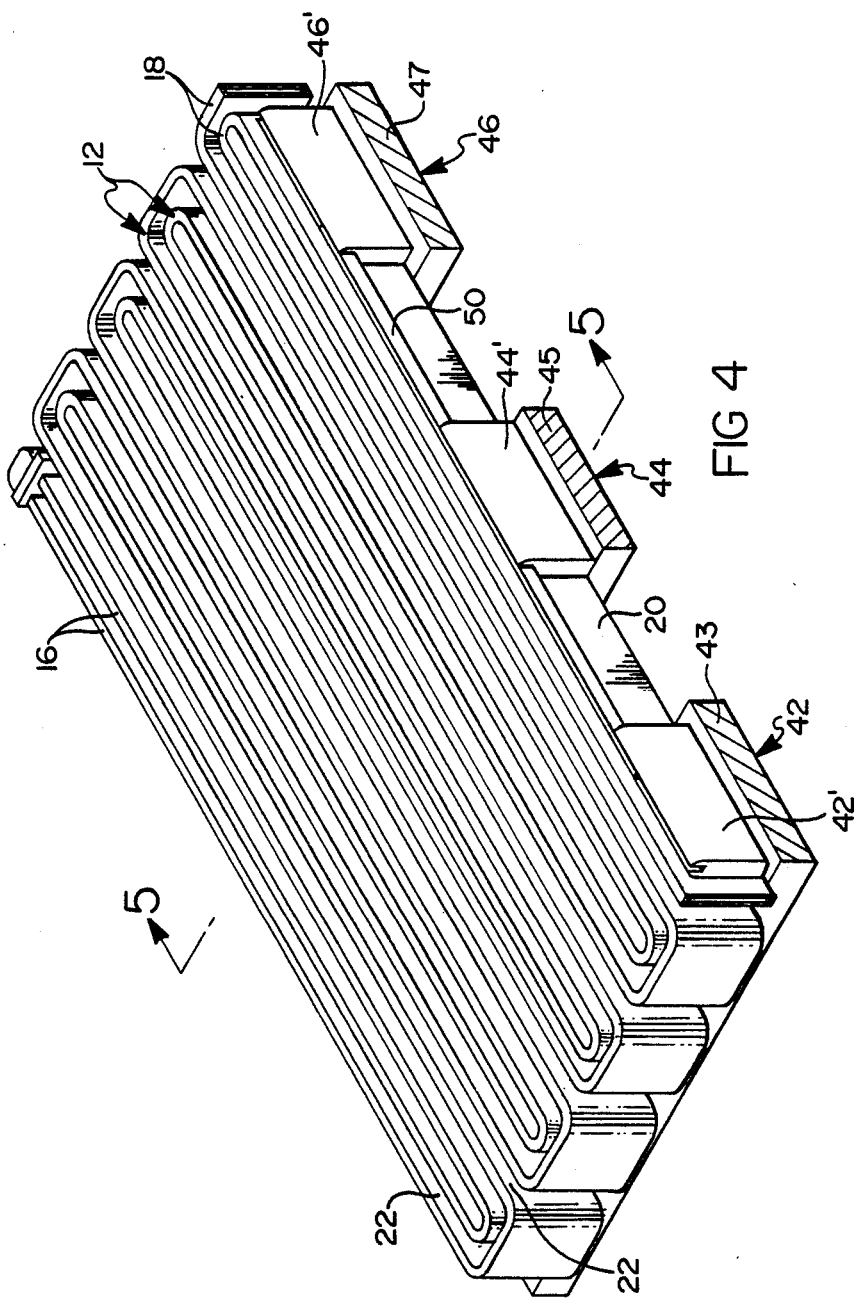
FIG. 4 is an isometric view of serpentine heat exchanger tubing and spreader tooling like that of FIG. 3 with the tooling in full engagement with the tubing according to the invention.

In FIG. 3, the blade sets are shown close together and the tubes 12 are poised to be lowered onto the blades which will then be spaced somewhat from the bends. Each blade 42', 44', 46' has a rounded upper edge or forward nose for entering the inter-tube space. The nose should be polished to aid in the insertion. For the laterally movable outboard blades, at least the lateral outboard edge of each blade should be tapered or rounded to facilitate the lateral movement between the tubes 12. The space between the blades of each set is several ten thousandths of an inch greater than the tube thickness to promote easy engagement with the tube. Prior to blade insertion the centers of the blades of each set have a spacing slightly greater than the corresponding tube spaces 22, thus preventing the exact alignment of the blades with the spaces until the blade insertion. Because the blades are not close to the bends, the blades spread the tubes and enter the tube spaces 22 at a place where the tubes are fairly flexible and entry is not difficult. After the blades are fully inserted, the outboard blade sets 42, 46 are moved laterally out toward the bends 18 to complete the spreading of the tubes as shown in FIG. 4. Only elastic deformation is desired so that the tubes will be able to spring back toward their original state. In the event there is any tendency for the bends to plastically deform, the spreader blades 42' and 46' are stopped about one inch from the bends to avoid plastic deformation.

Figure 5:
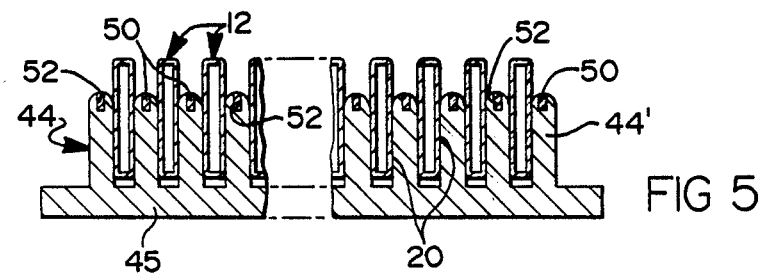
FIG. 5 is a cross section of the tubing and assembly tooling taken along line 5—5 of FIG. 4, and FIGS. 6 through 8 are cross sections of the tubing, fins and tooling showing progressive steps in the assembly of the fins to the tubing.
Figure 6:
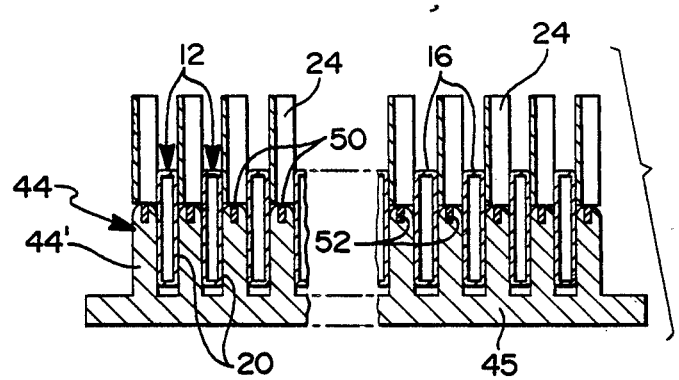
Figure 7:
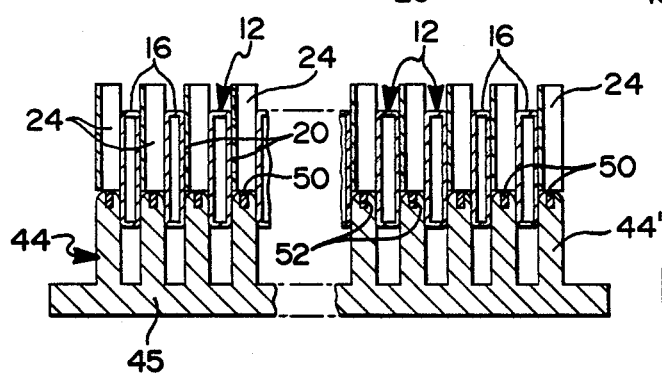
Figure 8:
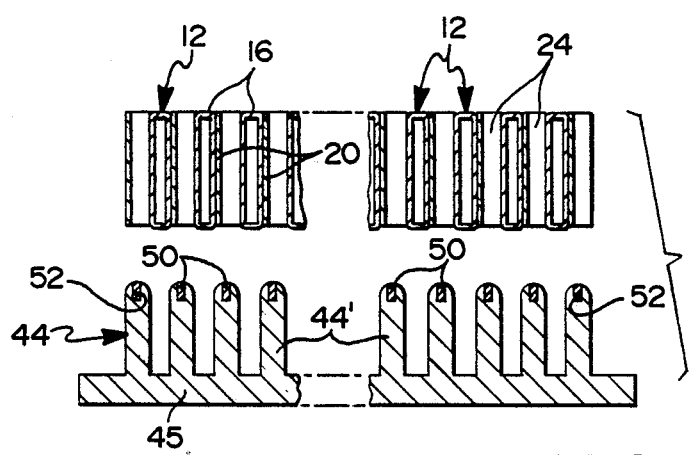

As shown in FIG. 5, which is a cross section of FIG. 4, the spreader blades are fully inserted into the tube spaces 22 and fully extended and are ready for withdrawal and fin insertion.(In FIGS. 5 through 8 the blades 44' are depicted as integral with the block 45, but may preferably be separate elements attached to the block.) The blades are shorter than the tube depth so that when fully inserted they reach only about three fourths of the way into the space. This geometry defines channels between the tubes and above the nose portions of the blades which form nests for locating the fins 24. The fins are positioned in the channels above the blades (FIG. 6) by a fixture, not shown, and are simultaneously fed into the spaces 22 as the blades are retracted. The bridge elements support the fins 24 in the regions between the blades. Generally the fins can depend on gravity feed and rest on the bridge elements 50 during the blade retraction. Preferably, to avoid any possible hang-up of the fins a light pressure is applied during the feeding. FIGS. 7 and 8 show the fins 24 partially inserted and fully inserted, respectively. When the spreader blades 42', 44' and 46' are fully withdrawn the tube 12 is free to contract until it firmly engages the fins 24. This completes the fin insertion process and the fins are held in place by the pressure of the tubes. The outer fins 30 and the side plates 28 are added to complete the core assembly as shown in FIG. 1 and bands 26 are added to help retain the elements in proper register until the brazing is completed and then the bands ::re removed.

A desirable side effect of the operation occurs when the outboard sets of spreader blades are moved laterally. The tubes are effectively ironed between adjacent blades so that if the tubes are not straight, significant deformation may be removed.

For heat exchanger cores of different lengths (from bend to bend) and different numbers of turns but using the same tube size and in thickness, the same tooling is used so that different models can be built on the same machine. The spreader sets must have enough blades and sufficient material movement to accomodate the largest cores. For any cores shorter than the largest, the lateral travel of the blades is adjusted and for cores with fewer than the maximum number of turns, some of the blades will be idle. Thus each machine is versatile and capable of running batches of different size cores. It should be evident that the machine is suitable for single tube serpentine structures as well as the described nested double tube assemblies.

The embodiments of the invention in which an exclusive property or privilege is claimed are defined as follows:

1. The method of assembling a serpentine style heat exchanger comprising the steps of:
   forming fins having a desired thickness,
   forming a serpentine tube structure with inter-tube spacing slightly less than the fin thickness thereby impeding insertion of the fins into the inter-tube spaces,
   elastically expanding the serpentine structure to enlarge the inter-tube spaces sufficiently to admit the fins,
   inserting the fins into the enlarged inter-tube spaces, and
   allowing the tube structure to elastically contract and grip the fins so that the fins are held under pressure of the serpentine tube.

2. The invention as defined in claim 1 wherein the inserting step comprises simultaneously inserting fins into all the inter-tube spaces.

3. The method of assembling a serpentine style heat exchanger comprising the steps of:
   forming fins having a desired thickness,
   forming a serpentine tube structure with inter-tube spacing slightly less than the fin thickness thereby impeding insertion of the fins into the inter-tube spaces,
   applying spreading force to adjacent tubes to elastically deform the serpentine structure for enlarging the inter-tube spaces sufficiently to admit the fins,
   inserting the fins into the inter-tube spaces, and
   relieving the spreading force to allow the tube structure to relax and grip the fins so that the fins are held under pressure of the serpentine tube.

4. The invention as defined in claim 3 wherein the step of applying spreading force comprises inserting into each inter-tube space a tool having a thickness slightly greater than the fin thickness, and
   the step of relieving the spreading force comprises withdrawing the tool simultaneously with inserting the fins.

5. The invention as defined in claim 1 wherein the step of forming a serpentine tube structure comprises the steps of forming two complementary serpentine tubes and nesting tubes and nesting the tubes together so that the inter-tube spaces are bounded by a different tube on each side.

* * * * *